(12) United States Patent
Okamoto et al.

(10) Patent No.: US 6,582,841 B2
(45) Date of Patent: Jun. 24, 2003

(54) FUEL CELL SYSTEM AND METHOD OF CONTROLLING THE SAME

(75) Inventors: Masaru Okamoto, Yokosuka (JP); Katsunori Oshiage, Fujisawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/781,186

(22) Filed: Feb. 13, 2001

(65) Prior Publication Data

US 2001/0014414 A1 Aug. 16, 2001

(30) Foreign Application Priority Data

Feb. 16, 2000 (JP) .......................... 2000-038403

(51) Int. Cl.[7] .................. H01M 8/00; H01M 8/04; H01M 8/18; H01M 8/12
(52) U.S. Cl. ................ 429/13; 429/17; 429/20; 429/22; 429/24
(58) Field of Search ................ 429/13, 17, 20, 429/22, 24, 25, 26

(56) References Cited

U.S. PATENT DOCUMENTS

| | | | | |
|---|---|---|---|---|
| 5,006,425 A | * | 4/1991 | Takabayashi | 429/19 |
| 5,248,567 A | * | 9/1993 | Amemiya et al. | 429/17 |
| 5,344,721 A | * | 9/1994 | Sonai et al. | 429/20 |
| 5,366,821 A | * | 11/1994 | Merritt et al. | 429/21 |
| 5,401,589 A | * | 3/1995 | Palmer et al. | 429/13 |
| 5,518,828 A | * | 5/1996 | Senetar | 429/16 |
| 5,595,059 A | * | 1/1997 | Huber et al. | 122/7 B |
| 5,635,139 A | * | 6/1997 | Holst et al. | 122/4 D |
| 5,650,128 A | * | 7/1997 | Holst et al. | 423/240 R |
| 5,925,476 A | * | 7/1999 | Kawatsu | 429/23 |
| 6,124,053 A | * | 9/2000 | Bernard et al. | 429/17 |
| 6,186,254 B1 | * | 2/2001 | Mufford et al. | 180/165 |
| 6,277,338 B1 | * | 8/2001 | Agee et al. | 422/189 |
| 6,280,864 B1 | * | 8/2001 | Towler et al. | 423/651 |
| 6,332,901 B1 | * | 12/2001 | Nagamiya et al. | 422/105 |
| 6,391,484 B1 | * | 5/2002 | Keskula et al. | 429/13 |

FOREIGN PATENT DOCUMENTS

| | | |
|---|---|---|
| JP | 08-273685 | 10/1996 |
| JP | 10-106607 | 4/1998 |

* cited by examiner

*Primary Examiner*—Randy Gulakowski
*Assistant Examiner*—Donald V. Scaltrito
(74) *Attorney, Agent, or Firm*—Foley & Lardner

(57) ABSTRACT

A fuel cell system and a method of controlling the same, wherein the fuel cell system includes a fuel cell 20, a reformer 12, a combustor 14, a combustor temperature controller 44 that controls output temperature of the combustor at a target temperature, and a reformed gas ingredient concentration presumption unit 32 that produces a presumed output representing ingredient concentration of reformed gas by using given parameters. The combustor temperature controller 44 produces a parameter correction data to correct the given parameters such that the output temperature of the combustor is controlled at the target temperature in quick response to variations in the output temperature of the reformer.

7 Claims, 6 Drawing Sheets

FUEL CELL SYSTEM AND METHOD OF CONTROLLING THE SAME

BACKGROUND OF THE INVENTION

1. Field of the Invention

The present invention relates to a fuel cell system and a method of controlling the same and, more particularly, to a fuel cell system and a method of controlling the same providing improved response time.

2. Description of the Related Art

In related art, a fuel cell system includes a reformer for reforming feedstock such as methanol to produce hydrogen rich reformed gas, a combustor for supplying heat to the reformer, and a fuel cell for reacting the reformed gas and oxygen gas contained in air supplied from an air supply unit to produce electric power.

In such a fuel cell system, the fuel cell is usually supplied with excessive amounts of reformed gas and air and all of the reformed gas and air are not consumed. Non-reacted reformed gas and air are exhausted from the fuel cell and returned to the combustor to be combusted. The combustor combusts them to generate heat, which is supplied to the reformer. In Japanese Patent application Laid-Open Publications H8-273685 and H10-106607, it has been proposed to control the flow rate of air to be supplied to the combustor with a view to controlling the output temperature of the combustor to a target temperature.

SUMMARY OF THE INVENTION

In the combustor of the above fuel cell system, it has been proposed to utilize reformed gas containing hydrogen rich gas produced in the fuel cell system, as one of fuels. An ingredient concentration, namely, hydrogen and CO concentration of the reformed gas usually varies in dependence on the operating condition of the fuel cell system. As the ingredient concentration of the reformed gas varies, the heating value of the combustor changes, while disturbing the output temperature of the combustor with a resultant unbalance caused in the whole operation of the fuel cell system.

The variation in the ingredient concentration of the reformed gas causes a serious disturbance when the output temperature of the combustor is controlled at a target temperature. Since the serious disturbance causes an unstable operation in a temperature control system of the combustor, it is difficult to set a control gain having a relatively large value. If, however, the control gain does not have the larger value, the response time of the fuel cell system is extremely deteriorated.

In the above fuel cell system and control method thereof, however, careful consideration has not been given to the fact that the temperature control of the combustor is adversely affected by the disturbance caused by the variation in the ingredient concentration of the reformed gas. As a result, the control gain should be restricted in a small range and, accordingly, the response time of the temperature control is sacrificed.

Besides, it is difficult to measure the ingredient concentration of the reformed gas on a real time basis. To cover this difficulty, an ingredient concentration presumption (estimation) unit may be provided that generate an ingredient concentration presumption output. This output may be utilized for compensating a control parameter. However, the ingredient concentration presumption unit has drawback in that there exists a deviation between a presumed (estimated) output and a current ingredient concentration of the reformed gas. This deviation causes a serious non-measurable disturbance in the fuel cell system.

In order to remove the non-measurable disturbance, an integrating control unit may be provided in the fuel cell system. However, even in such case, the response time of the temperature control in the combustor are seriously deteriorated. This is due to the fact that, when there exists the disturbance owing to the deviation in the output of the ingredient concentration presumption unit, an integral term to be calculated in the integrating control unit should have a large value in order to overcome malfunctions caused by the disturbance. Consequently, the control deviation value tends to decrease, thereby deteriorating the response time of the temperature control unit of the combustor wherein the output temperature should quickly respond to the target temperature especially when the target temperature is varied.

The present invention has been made in view of the above-described inadequacies of the fuel cell system and the method of controlling the same and has an object to provide a fuel cell system and a method of controlling the same, which overcome and eliminate the inadequacies discussed above. Namely, it is an object of the present invention to provide a fuel cell system and a method of controlling the same, wherein the fuel cell system includes a reformed gas ingredient concentration presumption unit adapted to control the output temperature of a combustor so as to restrain the influence due to the disturbance caused by the variation in the ingredient concentration of the reformed gas and the reformed gas ingredient concentration presumption unit can not be adversely affected by disturbances caused by a deviation in the ingredient concentration presumption unit when the ingredient concentration of the reformed gas changes, for thereby providing highly improved response time.

One aspect of the present invention is a fuel cell system provided with: a reformer reforming fuel to produce reformed gas; a combustor supplying heat to the reformer; an air supply unit supplying air; a fuel cell producing electric power by reacting the reformed gas and an oxygen gas contained in the air supplied by the air supply unit; an exhaust system returning exhaust reformed gas and exhaust air from the fuel cell to the combustor; an exhaust reformed gas ingredient concentration presumption unit calculating ingredient concentration of the exhaust reformed gas by using given parameters and producing a presumed output representing the ingredient concentration of the exhaust reformed gas; a combustor's output temperature detector detecting an output temperature of the combustor and producing a combustor's output temperature detection output; a combustor temperature controller controlling the output temperature of the combustor in response to the presumed output of the ingredient concentration of the exhaust reformed gas and the combustor's output temperature detection output at a predetermined target temperature; a parameter correction discriminating section discriminating whether correction is required in the given parameters of the exhaust reformed gas ingredient concentration presumption unit and producing a parameter correction discriminating output; and a parameter correction data calculating section producing a parameter correction data in response to the parameter correction discriminating output to correct the given parameters of the exhaust reformed gas ingredient concentration presumption unit.

In other words, a fuel cell system of the present invention includes: means for calculating ingredient concentration of the exhaust reformed gas by using given parameters and producing a presumed output representing the ingredient concentration of the exhaust reformed gas; means for detecting an output temperature of the combustor and producing a combustor's output temperature detection output; means for controlling the output temperature of the combustor in response to the presumed output and the combustor's output temperature detection output at a predetermined target temperature; means for discriminating whether correction is required in the given parameters and producing a parameter correction discriminating output; and means for producing a parameter correction data in response to the parameter correction discriminating output to correct the given parameters.

Besides, a method of controlling a fuel cell system of the present invention calculates ingredient concentration of the exhaust reformed gas by using given parameters and producing a presumed output representing the ingredient concentration of the exhaust reformed gas; detects an output temperature of the combustor and producing a combustor's output temperature detection output; controls the output temperature of the combustor in response to the presumed output and the combustor's output temperature detection output at a predetermined target temperature; discriminates whether correction is required in the given parameters and producing a parameter correction discriminating output; and produces a parameter correction data in response to the parameter correction discriminating output to correct the given parameters.

Other and further features, advantages, and benefits of the invention will become more apparent from the following description taken in conjunction with the following drawings. It is to be understood that the foregoing general description and the following detailed description are exemplary and explanatory but are not to be restrictive of the invention. The accompanying drawings which are incorporated in and constitute a part of the invention, illustrate embodiments of the invention and, together with the description, serve to explain the principles of the invention in general terms. Incidentally, like numerals refer to like parts throughout the disclosure.

DETAILED DESCRIPTION OF THE PREFERRED EMBODIMENTS

A description of a fuel cell system and a method of controlling the same in accordance with each of embodiments of the present invention will be in detail given below suitably with reference to the accompanying drawings.

First, a fuel cell system and a method of controlling the same of the first embodiment of the present invention is described in detail with reference to FIGS. 1 to 5.

Figure 1:
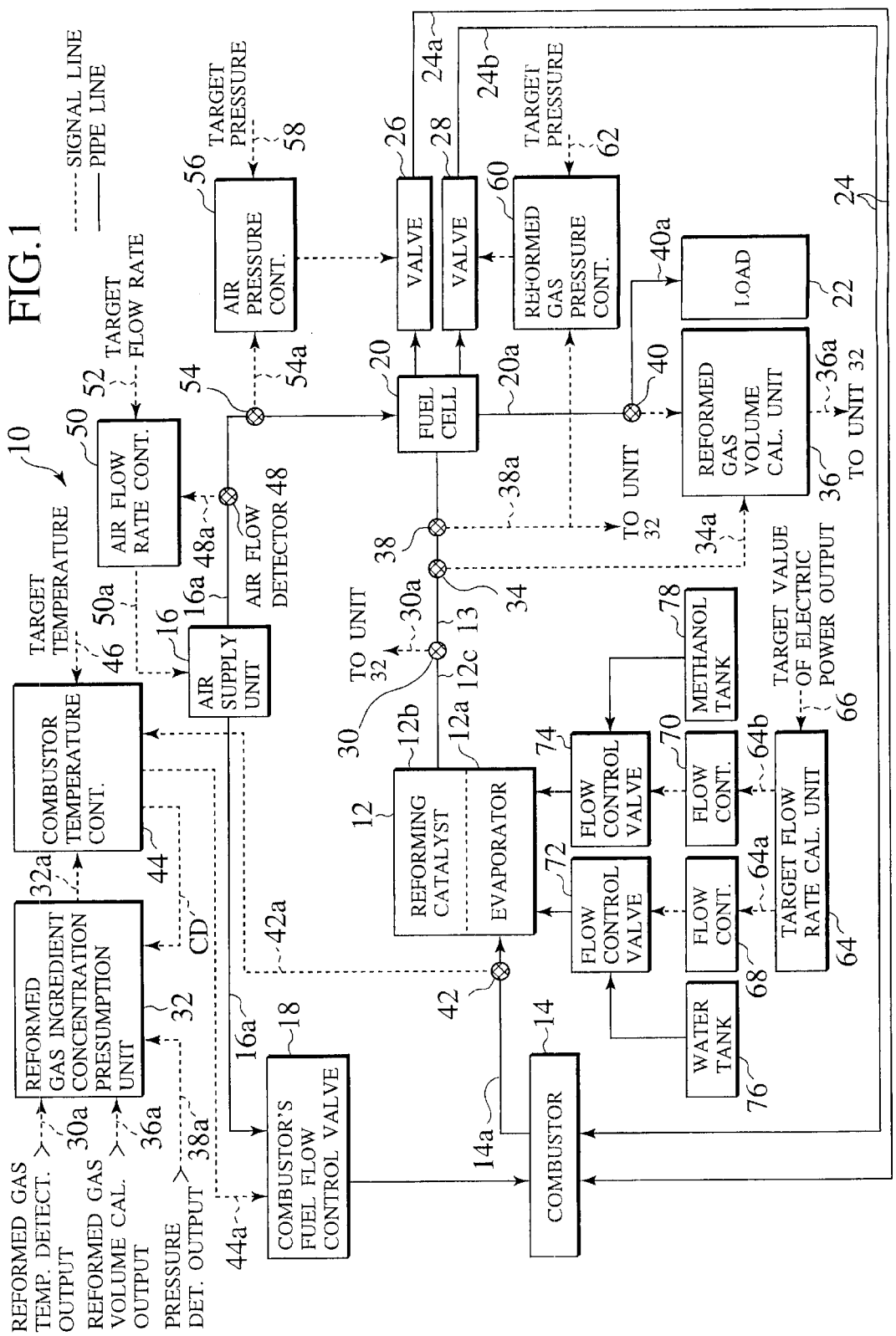
FIG. 1 is a schematic block diagram of a fuel cell system of the first embodiment according to the present invention.

Referring now to FIG. 1, there is shown a fuel cell system 10 of the first embodiment according to the present invention. The fuel cell system 10 includes a reformer 12 that reforms fuel to produce reformed gas 12c, a combustor 14 adapted to supply heating gas 14a to the reformer 12, an air supply unit 16 that includes a compressor adapted to supply air 16a under pressure through a combustor fuel flow control valve 18 to the combustor 14, and a fuel cell 20 that reacts the reformed gas 12c and oxygen (oxygen gas) contained in air 16a to generate electric power 20a to be supplied to load 22. The fuel cell system 10 also includes an exhaust system 24 connected between the fuel cell 20 and the combustor 14 to return exhaust gases thereto. The exhaust gas system 24 has an exhaust air return line 24a and exhaust reformed gas return line 24b for supplying exhaust air and exhaust reformed gas to the combustor 14 via first and second pressure regulator valves 26 and 28, respectively. The reformer 12 has an evaporator 12a and a reforming catalyst 12b. In FIG. 1, the air supply unit 16 usually includes an air compressor but may include other expedients such as a blower.

In FIG. 1, the fuel cell system 10 further includes a reformed gas temperature detector 30 connected between the reformer 12 and the fuel cell 20 to detect the temperature of the reformed gas 12c to be supplied to the fuel cell 20 for producing a reformed gas temperature detection output 30a, that is applied to a reformed gas ingredient concentration presumption unit (exhaust reformed gas ingredient concentration presumption unit) 32. The reformed gas ingredient concentration presumption unit 32 generates a reformed gas ingredient concentration presumption output (exhaust reformed gas ingredient concentration presumption output) 32a that will be discussed later. A reformed gas flow rate detector 34 is connected to a conduit 13 at a point downstream of the reformed gas temperature detector 30 to detect the flow rate of the reformed gas 12c for generating a reformed gas flow rate detection output 34a. The reformed gas flow rate detection output 34a is applied to a reformed gas volume calculation unit (exhaust reformed gas volume calculation unit) 36 adapted to produce a reformed gas volume calculation output (exhaust reformed gas volume calculation output) 36a, that is also applied to the reformed gas ingredient concentration presumption unit 32. A reformed gas pressure detector 38 is located in the pipe line 13 at a point downstream of the reformed gas flow rate detector 34 to detect the pressure of the reformed gas 12c to be supplied to the fuel cell 20 for generating a reformed gas pressure detection output 38a, that is applied to the reformed gas ingredient concentration presumption unit 32. An electric power output detector 40 is connected to the fuel cell 20 to detect electric power output generated by the fuel cell 20 and generates an electric power output detection output 40a. A combustor's output temperature detector 42 is located between the combustor 14 and the reformer 12 to detect the temperature of the heating gas 14a (namely, the output temperature of the combustor 14) for generating a combustor's output temperature detection output 42a, that is applied to a combustor temperature controller 44 to which a target temperature signal 46 is also inputted by some suitable means such as a key board (not shown). The combustor temperature controller 44 responds to the reformed gas ingredient concentration output 32a and the combustor's output temperature detection output 42a to generate a parameter correction data CD and a temperature control output 44a. An air flow rate detector 48 is located between the air supply unit 16 and the fuel cell 20 to detect the flow rate of the air to be supplied to the fuel cell 20 for generating an air flow rate detection output 48a, that is applied to an air flow rate controller 50 to which a target air flow rate signal 52 is inputted from outside. An air pressure detector 54 is located between the sir supply unit 16 and the fuel cell 20 to detect the pressure of air 16a to be supplied thereto for generating an air pressure detection output 54a, that is applied to an air pressure controller 56 to which a target air pressure signal 58 is also inputted. The air pressure controller 56 functions to control the valve opening of the first valve 26 to control the amount of exhaust air 24a to be supplied to the combustor 14 in response to the air pressure detection output 54a and the target air pressure signal 58. Likewise, a reformed gas pressure controller 60 is connected to the reformed gas pressure detector 38, that responds to the reformed gas pressure detection output 38a and a target reformed gas pressure signal 62 to control the valve opening of the second valve 28 for thereby controlling the amount of exhaust reformed gas 24b to be supplied to the combustor 14.

In the fuel cell system 10 of FIG. 1, the reformed gas ingredient concentration presumption unit 32 includes parameter memory units storing given parameters related to reformed gas temperature, reformed gas flow rate, reformed gas pressure and output temperature of the combustor 14, and compares the reformed gas temperature detection output 30a, the exhaust reformed gas volume calculation output 36a, the reformed gas pressure detection output 38a and the parameter correction data CD with the corresponding parameters stored in the respective parameter memory units. Thus, the reformed gas ingredient concentration presumption unit 32 calculates the given parameters and the various outputs to generate a presumed output 32a representing ingredient concentration of the reformed gas 12c to be supplied to the fuel cell 20. The combustor temperature controller 44 responds to the combustor's output temperature detection output 42a and the presumed output 32a, and produces the parameter correction data CD. The temperature control output 44a is applied to the combustor fuel flow rate control valve 18 that controls the flow rate of air 16a to be supplied to the combustor 14 such that the temperature of the heating gas 14a is maintained at a target temperature that is inputted to the combustor temperature controller 44.

The fuel cell system 10 further includes a target flow rate calculation unit 64 that is applied with an input signal 66 representing a target value of electric power output to be produced by the fuel cell 20. The target flow rate calculation unit 64 calculates target values of water and fuel to be supplied to the reformer 12 on the basis of the input signal 66, thereby producing first and second target signals 64a, 64b. The first and second target signals 64a, 64b are supplied to first and second flow rate controllers 68 and 70, which control first and second flow rate control valves 72, 74. The first and second flow rate control valves 72, 74 are connected to a water tank 76 and a methanol tank 78, respectively, to control feed water and feed methanol to be supplied to the reformer 12 at desired flow rates, respectively.

In operation, the evaporator 12a of the reformer 12 heats fuel composed of the feed water and the methanol with the heating gas 14a supplied from the combustor 14, thereby producing steam and methanol vapor. The steam and methanol vapor are supplied to the reacting catalyst 12b and reacted therein to produce hydrogen rich reformed gas 12c. In this connection, the target flow rate calculation unit 64 calculates demanded flow rates of feed water and methanol to be required by the fuel cell 20 to produce demanded electric power. The first and second target signals 64a, 64b represent the demanded flow rates of feed water and methanol, respectively, which are supplied to the first and second flow rate controllers 68, 70, respectively.

The first and second flow rate controllers 68, 70 calculate valve openings of the first and second flow rate control valves 72, 74 and control the valve openings of the first and second flow rate control valves 72, 74, respectively. Thus, the flow rates of the water and methanol are regulated by the first and second flow rate control vales 72, 74 such that the amount of reformed gas 12c produced by the reformer 12 is regulated at a desired value determined by the demanded electric power to be produced by the fuel cell 20.

The reformed gas 12c produced by the reformer 12 is then introduced to the fuel cell 20. The fuel cell 20 is also supplied with air 16a such that hydrogen contained in the reformed gas 12c and oxygen contained in air 16a are reacted in the fuel cell 20, thereby producing electric power 20a. Electric power 20a is consumed by load 22 such as a battery (not shown) or an electric motor (not shown).

The reformed gas flow rate detector 34 detects the flow rate of the reformed gas 12c, thereby producing the reformed gas flow rate detection output 34a. The exhaust reformed gas volume calculation unit 36 calculates the volume of hydrogen consumed by the fuel cell 20 on the basis of electric power produced thereby to produce a calculated product and also calculates the volume of the reformed gas 12c that has been supplied to the fuel cell on the basis of the calculated product and the reformed gas flow rate detection output 34a to produce the exhaust reformed gas volume calculation output 36a.

The exhaust air 24a and the exhaust reformed gas 24b that have not been consumed by the fuel cell 20 are returned to the combustor 14 through the exhaust gas system 24. The first pressure regulator valve 26 functions to control the flow rate of the exhaust air 24a.

The first pressure control valve 26 is regulated so as to have a demanded valve opening by the air pressure controller 56 in dependence on the air pressure detection output 54a and the target pressure signal 58, thereby maintaining the exhaust air at a target pressure.

Likewise, second pressure regulator valve 28 functions to control the pressure of the reformed gas 12c remaining between the reformer 12 and the fuel cell 20. The second pressure regulator valve 28 is controlled by the reformed gas pressure controller 60 that regulates the valve opening of the pressure regulator valve 28 in dependence on the reformed gas pressure detection output 38a and the target reformed gas pressure signal 62, thereby maintaining the exhaust reformed gas at a target pressure.

The air flow rate controller 50 functions to calculate a demanded frequency for the compressor forming the air supply unit 16 in dependence on the air flow rate detection output 48a and the target flow rate signal 52 and to produce an air flow control signal 50a representing the demanded frequency. The air supply unit 16 responds to the air flow rate control signal 50a such that the rotational speed of the compressor is controlled to supply air 16a at a given flow rate to the fuel cell 20.

The exhaust air 24a and the exhaust reformed gas 24b are supplied to the combustor 14 through the exhaust gas recirculation system 24 and are combusted therein to produce the heating gas 14a. The heating gas 14a is then supplied to the reformer 12 to form the reformed gas 12c in a manner as discussed above.

The reformed gas ingredient concentration presumption unit 32 functions to presumably calculate the ingredient concentrations of hydrogen and carbon monoxide (CO) contained in the reformed gas 12c on the basis of the reformed gas temperature detection output 30a, the exhaust reformed gas volume calculation output 36a, the reformed gas pressure detection output 38a and the parameter correction data CD, thereby producing the reformed gas ingredient concentration presumption output 32a.

While, in the embodiment discussed above, the fuel cell system 10 has been shown and described above as having utilized only the output of the exhaust reformed gas volume calculation unit 36, a modification may be made such that the reformed gas ingredient concentration calculation unit 32 may presumably calculate the hydrogen and carbon monoxide concentrations directly on the basis of the reformed gas flow rate detection output 34a and the electric power detection output 40a.

The combustor temperature controller 44 functions to produce the temperature control output 44a that is applied to the combustor fuel flow control valve 18 to control the output temperature of the combustor 14 at a level determined by the target temperature signal 46. To this end, the combustor temperature controller 44 functions to calculate a demanded valve opening of the combustor fuel flow rate control valve 18 on the basis of the reformed gas ingredient concentration presumption output 32a, the combustor's output temperature detection output 42a and the target temperature signal 46, thereby providing the temperature control output 44a representing the demanded valve opening. The temperature control output 44a is applied to the combustor fuel flow control valve 18, which is controlled so as to have the demanded valve opening. Thus, the combustor fuel flow rate control valve 18 regulates the flow rate of air to be supplied to the combustor 14.

Now, the reformed gas ingredient concentration presumption unit 32 will be described more in detail with reference to FIGS. 2A and 2B. The reformed gas ingredient concentration presumption unit 32 includes a hydrogen ingredient concentration presuming section 32A shown in FIG. 2A, and a CO concentration presuming section 32B shown in FIG. 2B.

Figure 2A:
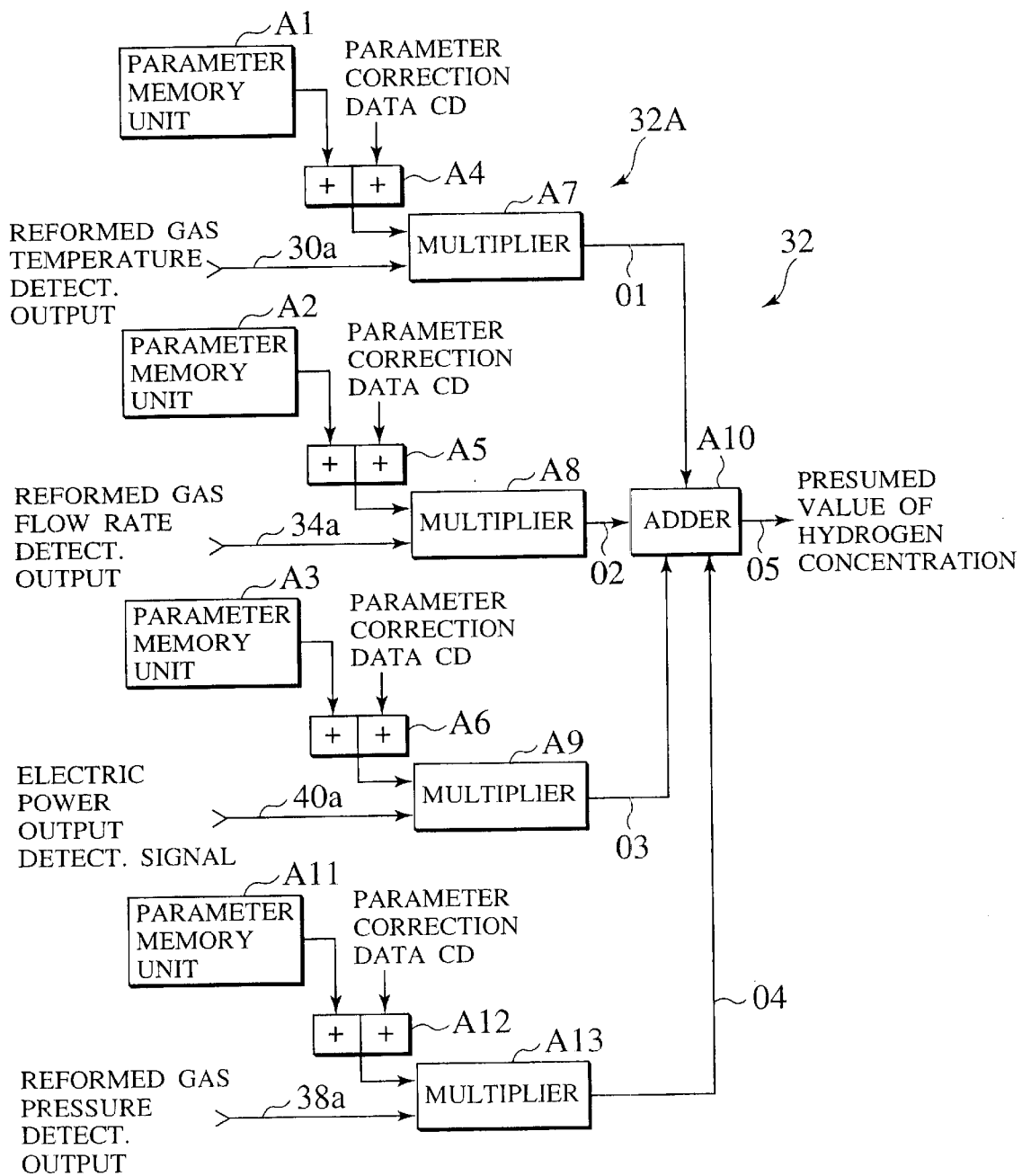
FIGS. 2A and 2B are block diagrams illustrating a reformed gas ingredient concentration presumption unit forming part of the fuel cell system of the first embodiment.

As seen in FIG. 2A, the hydrogen ingredient concentration presumption unit 32 includes first, second and third parameter memory units A1, A2 and A3, first, second and third adders A4, A5 and A6, first, second and third multipliers A7, A8 and A9, and a main adder A10. The hydrogen ingredient concentration unit 32A also includes a parameter memory unit A11, an adder A12, and a multiplier A13. In such a structure, the hydrogen ingredient concentration presumption unit 32 performs a calculation process in a manner described below.

A first parameter preliminarily stored in the first parameter memory unit A1 and a parameter correction data CD (namely, an output of a parameter correction data calculating section C6 for the reformed gas ingredient concentration presuming unit) are inputted to the multiplier A7 that produces a first output O1. The first output O1 and the reformed gas temperature detection output 30a produced by the reformed gas temperature detection unit 30 are inputted to the multiplier A7 that produces an output O1.

A second parameter preliminarily stored in the second parameter memory unit A2, and the parameter correction data CD are inputted to the adder A5 that produces a second output. The second output and the reformed gas flow rate detection output 34a produced by the reformed gas flow rate detection unit 34 are inputted to the multiplier A8 that produces an output O2.

A third parameter preliminarily stored in the parameter memory unit A3 and the correction data CD are inputted to the adder A6 that produces a third output. The third output and the electric power detection output 40a are inputted to the multiplier A9 that produces an output O3.

Finally, a fourth parameter preliminarily stored in the fourth parameter memory unit A11 and the parameter correction data CD are inputted to the adder A12 that produces a fourth output. The fourth output and the reformed gas pressure detection 38a are inputted to the multiplier A13 that produces a fourth output O4. The outputs O1, O2, O3, O4 are inputted to the adder A10 that produces an output O5 representing a presumed value of hydrogen concentration.

Values of parameters preliminarily stored in the parameter memory units A1, A2, A3, A11 are derived from repetitive tests that have been conducted at a laboratory. During testing at the laboratory, the reformed gas delivered from the reformer 12 is removed on a time series basis for sampling purposes, and hydrogen concentration in the reformed gas is measured by using a gas analyzer to provide measured data. Then, functions presuming the hydrogen concentration are prepared from the measured data, and the reformed gas temperature detection output 30a, the reformed gas volume calculation output 36a (or the reformed gas flow rate detection output 34a and the electric power detection output 40a) and the reformed gas pressure detection output 38a that are stored in a data memory unit. Although it has generally been known to prepare the functions by using a linear forecast process on the basis of a regression analysis employing least squares, the functions may also be prepared by using a non-linear process such as a neural network. In the embodiment of the present invention, the functions has been prepared by using a process that is known as "Partial Least Squares (PLS) that is well known as having the highest forecast accuracy by solving a problem of a multiple co-linear characteristic encountered in the regression analysis.

Figure 2B:
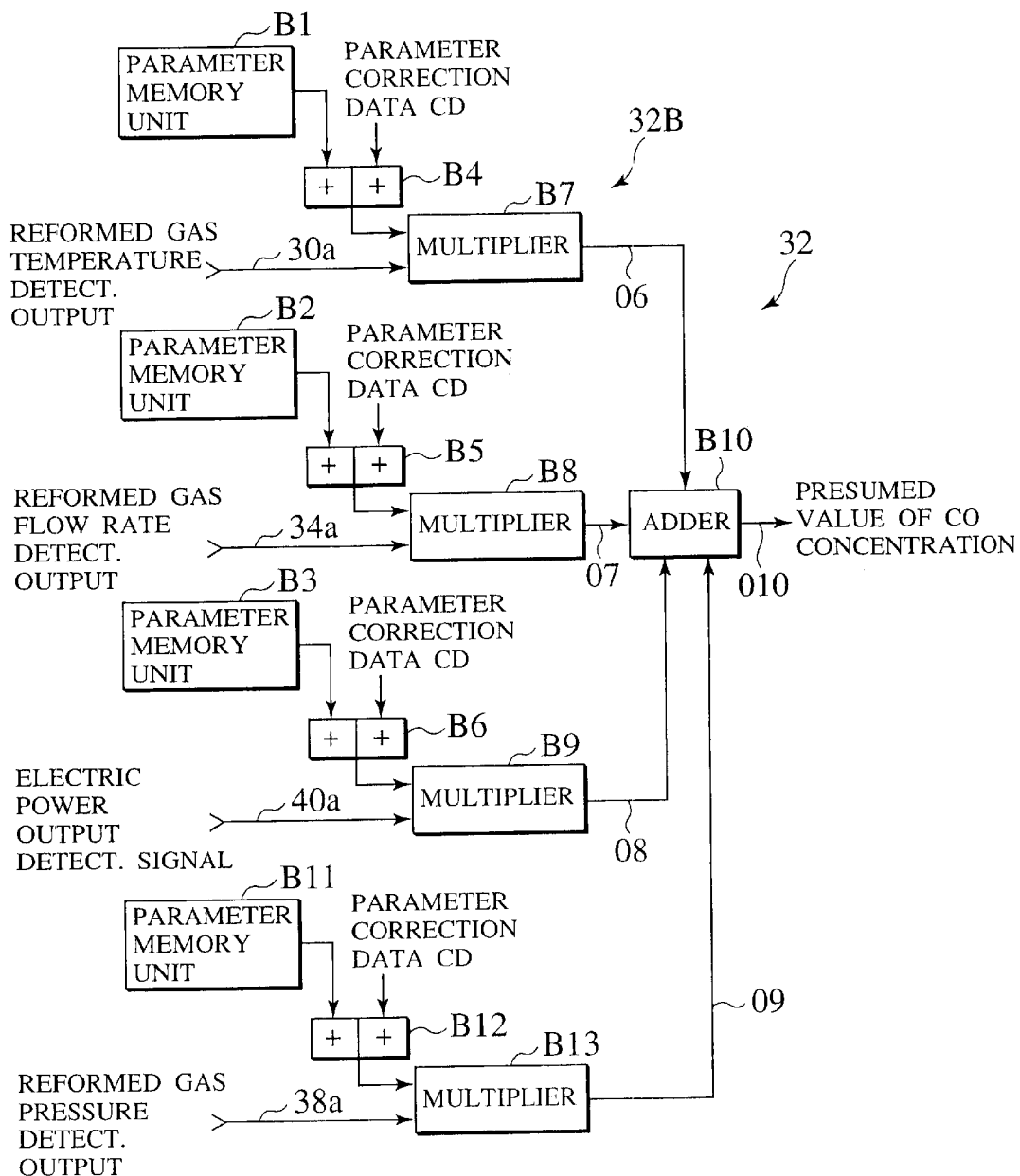

Likewise, the CO concentration contained in the reformed gas is calculated by the CO concentration presuming section 32B in FIG. 2B. In FIG. 2B, the CO concentration presuming section 32B includes first, second and third parameter memory units B1, B2, B3, first, second and third adders B4, B5, B6, first, second and third multipliers B7, B8, B9 adapted to produce first, second and third outputs O5, O6, O7. The CO concentration presuming section 32B also includes a fourth parameter memory unit B11, a fourth adder B12, a fourth multiplier B13 adapted to produce a fourth output O8, and a main adder B10.

In FIG. 2B, the first parameter preliminarily stored in the first parameter memory unit B1 and the parameter correction data CD (namely, the output of the parameter correction quantity calculating section C6) are inputted to the adder B4 to obtain a first output representing the first parameter corrected by the correction data. The first output and the reformed gas temperature detection output 30a are inputted to the multiplier B7 that produces the first output O6. The second parameter stored in the second parameter memory unit B2 and the parameter correction data CD are inputted to the adder B5 to obtain a second output representing the second parameter corrected by the parameter correction data CD. The reformed gas flow rate detection output 34a and the second output are inputted to the second multiplier B8 that produces the second output O7. The third parameter preliminarily stored in the third parameter memory unit B3 and the correction data CD are inputted to the adder B6 that produces a third output representing the third parameter corrected by the parameter correction data CD. The output of the third adder B6 and the electric power detection output 40a are inputted to the multiplier B9 that produces the third output O8. The fourth parameter preliminarily stored in the fourth parameter memory unit B11 and the parameter correction data CD are inputted to the adder B12 that produces a fourth output. The output of the adder B12 and the reformed gas pressure detection output 38a are inputted to the multiplier B13 that produces the fourth output O9.

The first, second, third and fourth outputs O6, O7, O8, O9 are inputted to the main adder B10, which produces an output signal O10 representing a presumed value of CO concentration. The parameters preliminarily stored in the parameter units B1 to B3 and B11 have been derived from the same sampling process as that discussed above with respect to the hydrogen ingredient concentration presuming section 32A.

Figure 3:
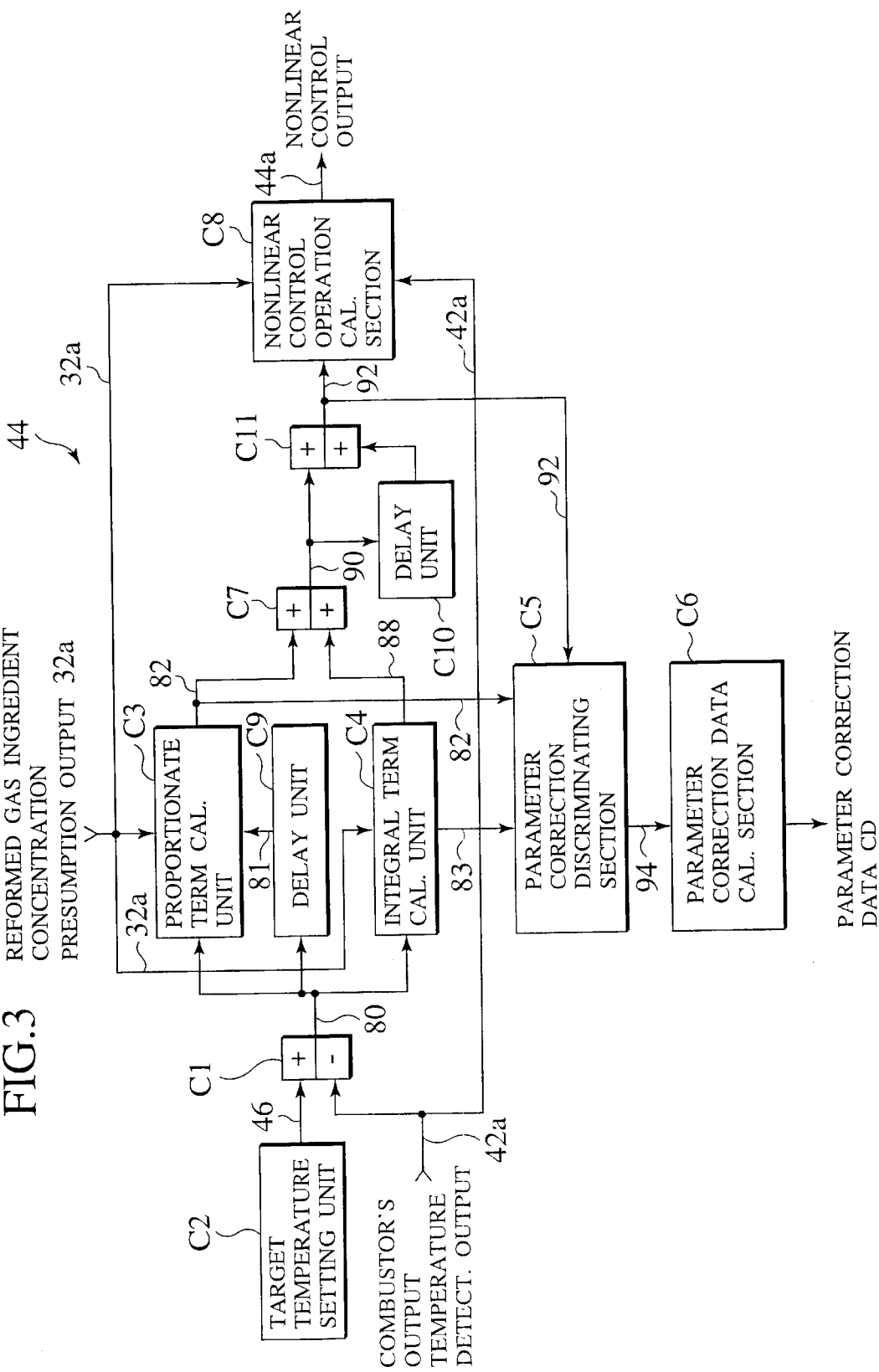
FIG. 3 is a block diagram of a combustor temperature controller forming part of the fuel cell system of the first embodiment.

Now, the combustor temperature controller 44 will be described in detail with reference to FIG. 3. In FIG. 3, the combustor temperature controller 44 includes a subtracting unit C1, which is applied with the combustor's output temperature detection output 42a and the target temperature signal 46 outputted by a target temperature input unit C2. The subtracting unit C1 calculates such that the combustor's output temperature detection output 42a is subtracted from the target temperature signal 46 to provide an output 80 representing an error or deviation between the two inputs.

The output 80 of the subtracting unit C1 is inputted to a proportionate term calculating section C3 and an integral term calculating section C4. The output 80 is delayed by an amount corresponding to the sampling time by a delay unit C9 to produce a delayed output 81 that is applied to the proportionate term calculating section C3. The reformed gas ingredient concentration presumption output 32a is also applied to the proportionate term calculating section C3 and the integral term calculating section C4.

The proportionate term calculating section C3 functions to generate an output 82 representing a control quantity proportional to the output 80. The proportionate term calculating section C3 operates in a manner shown in FIG. 4. That is, the output 32a is inputted to a proportionate control gain calculating unit D1 and converted by a function f1 that is preliminarily and experimentally determined on the basis of various experimental tests, thereby producing an output 83 representing a calculated control gain. This function f1 is registered as a map factor representing a process gain related to the reformed gas ingredient concentration and the combustor's output temperature.

Figure 4:
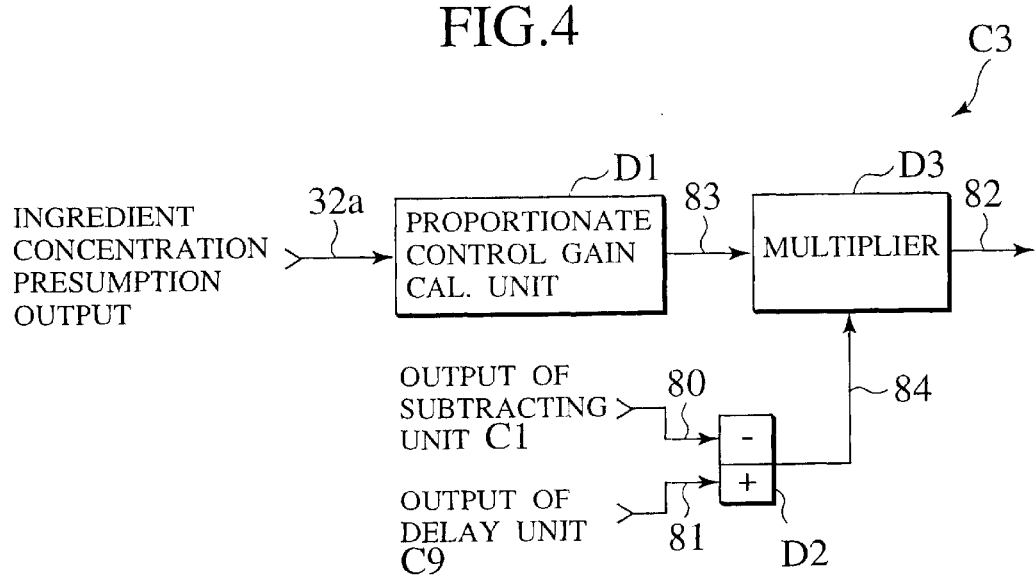
FIG. 4 is a block diagram illustrating a proportionate term calculating section of the combustor temperature controller of the first embodiment.

In FIG. 4, the output 80 of the subtracting unit C1, and the output 81 of the delay unit C9 are inputted to a subtracting unit D2. The subtracting unit D2 calculates these inputs to produce an output 84 representing a deviation between the outputs 80 and 81. The output 84 is inputted to a multiplier D3 that is also applied with the output 83. The multiplier D3 multiplies the outputs 83 and 84, thereby producing the output 82.

Figure 5:
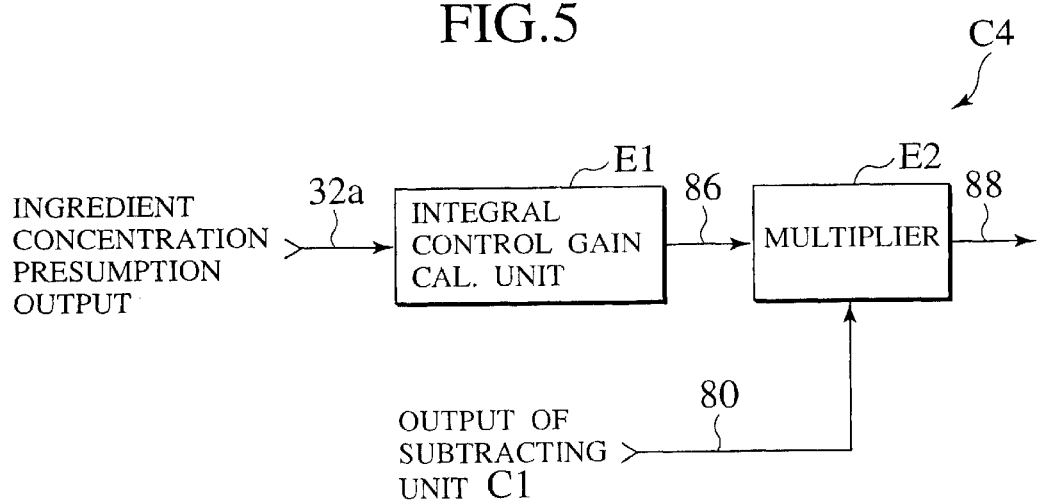
FIG. 5 is a block diagram illustrating an integral term calculating section of the combustor temperature controller of the first embodiment.

In FIG. 3, the reformed gas ingredient concentration presuming output 32a and the output 80 of the subtracting unit C1 are inputted to an integral term calculating unit C4. The integral term calculating unit C4 functions to calculate the outputs 32a and 80 for producing an output representing a control quantity. As shown in FIG. 5, the integral term calculating unit C4 includes an integral control gain calculating unit E1 and a multiplier E2. The reformed gas ingredient concentration presuming output 32a is applied to the integral control gain calculating unit E1, that produces an output 86 by converting the output 32a with a function f2 preliminarily and experimentally determined from various tests conducted at the laboratory.

The output 86 represents a control gain. The function f2 are registered as a map factor representing a process gain related to the reformed gas ingredient concentration and the combustor's output temperature. The output 86 is inputted to the multiplier E2 that multiplies the output 80, 86, thereby producing an output 88.

Turning back to FIG. 3, the outputs 82, 88 of the proportionate term calculating unit C3 and the integral term calculating unit C4 are inputted to an adder C7 that produces an output 90. The output 90 and an output of a delay unit C10 are inputted to an adder C11 that produces an output 92. The outputs 32a, 42a, 92 are inputted to a non-linear control amount calculating unit C8 that produces an output 44a representing a non-linear control amount. The output 44a is applied to the combustor fuel flow rate control valve 18 to control the valve opening thereof.

In FIG. 3, the combustor temperature controller 44 further includes a parameter correction discriminating section C5 for the reformed gas ingredient concentration presumption unit 32. In the event that the output 82 of the proportionate term calculating section C3 is below a given small value, that the output 83 of the integral calculating section C4 is not at low level and that the output 92 of the adder C11 exceeds upper or lower extreme values, this means that an integral calculation amount exceeds predetermined upper or lower extreme values and, therefore, the parameter correction discriminating section C5 judges that there exists a deviation or error in the reformed gas ingredient concentration presumption unit 32. In this event, the parameter correction discriminating section C5 produces an output 94 representing the above noted deviation. The output 94 is inputted to a parameter correction amount calculating section C6, that calculates a parameter correction amount to produce the parameter correction data CD to reduce the deviation between the temperature of the heating gas (namely, the output temperature of the combustor 14) and the target temperature signal 46. The parameter correction data CD is inputted to the reformed gas ingredient concentration presumption unit 32, thereby correcting and storing the parameter in the parameter memory units A1, A2, A3 and A11 in FIG. 2A, and the parameter in the parameter memory units B1, B2, B3 and B11 in FIG. 2B.

In FIG. 3, if the output 92 of the adder C11 remains at a positive level, this means that a control operation is needed in a direction to decrease the output temperature of the combustor 14. In the embodiment of the invention, the flow rate of air to be introduced into the combustor 14 is controlled because an increase in the flow rate of air causes a reduction of the output temperature of the combustor 14. Consequently, when the output 92 of the adder C11 goes to a positive level, there exists a deviation between the output temperature of the combustor 14 and the target temperature. Consequently, the parameter to be stored in the reformed gas ingredient concentration presumption unit 32 is corrected such that the amount of control operation is calculated so as to decrease the output temperature of the combustor 14.

In the embodiment of the present invention, a particular parameter correction process has been shown and described wherein the parameter is adjusted within a predetermined small varying range. In addition, in the event that an amount of control operation is shifted in a direction opposite to that expected when a parameter is varied to change the output temperature of the combustor 14, a direction to be varied for the parameter is suitably inverted.

Turning back to FIG. 3, the non-linear control amount calculation unit C8 calculates a non-linear control amount in a manner discussed below. Here, the non-linear control amount is calculated by utilizing a combustor model, the output 32a of the reformed gas ingredient concentration calculation unit 32, and the output 42a of the combustor output temperature detector 42.

For example, the non-linear control amount will be calculated in the following steps. The combustor model may be expressed by the formula:

$dT/dt = p1$ (T)×(the output O5 representing the hydrogen ingredient concentration (namely, the output O4 of the multiplier A13))+$p2$ (T)×(the output O10 representing the CO ingredient concentration (namely, the output O9 of the multiplier B13))+$p3$ (T)×(the flow rate of air to be introduced into the combustor 14)+$p4$ (T), where p1, p2, p3 and p4 represent non-linear model parameters and T represents the output 42a of the combustor's output temperature detector 42.

From this combustor model, the non-linear control amount may be calculated by the formula:

$U$=(the output 92 of the adder C11)−b1×T−b2×{p1 (T)×(the output O4 of the multiplier A13)+p2 (T)×(the output O9 of the multiplier B13)+p4 (T)/(b1×p3 (T))}, where b2 and b2 represent suitable correction parameters, and T represents the output 42a of the combustor's output temperature detector 42.

Next, the second embodiment of the present invention is described with reference to FIG. 6.

Figure 6:
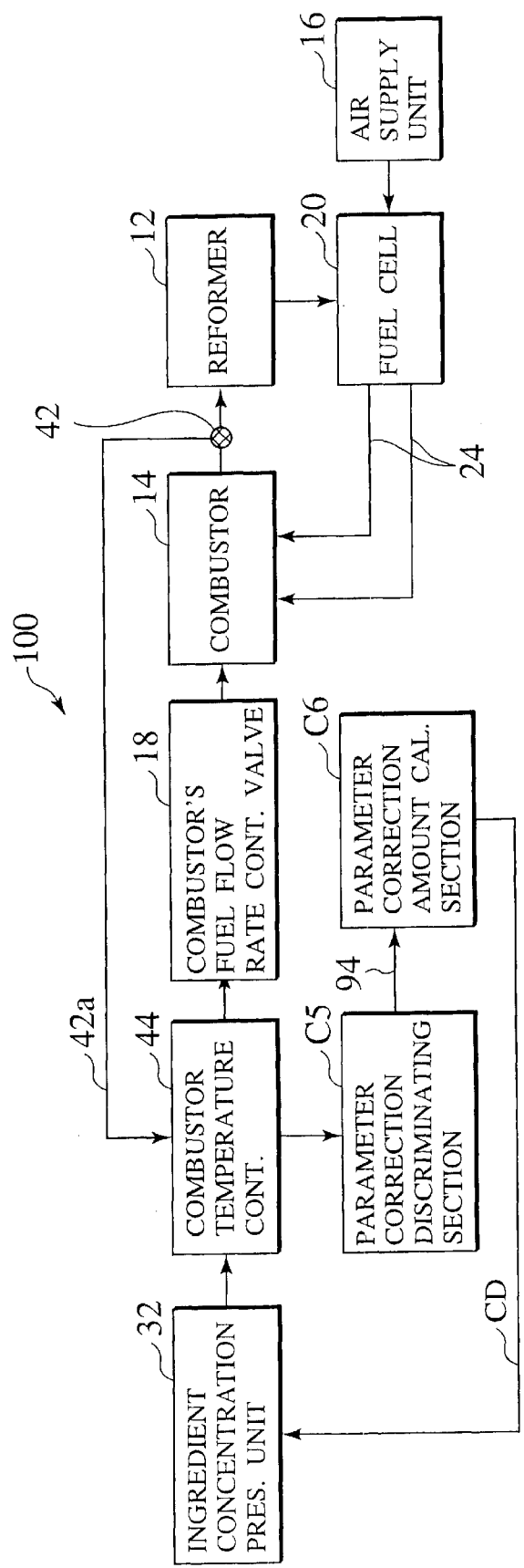
FIG. 6 is a block diagram of the second embodiment of a fuel cell system according to the present invention.

FIG. 6 illustrates a schematic block diagram of a fuel cell system of the second embodiment, with like parts bearing the same reference numerals as those used in FIGS. 1 to 5. In FIG. 6, the fuel cell system 100 includes a reformer 12 adapted to reform fuel to produce reformed gas, a combustor 14 adapted to supply heat to the reformer 12, an air supply unit 16, a fuel cell 20 adapted to produce electric power by reacting reformed gas supplied from the reformer 12, and oxygen contained in air supplied from the air supply unit 16, and an exhaust system 24 for returning exhaust reformed gas and air, which are not used in the fuel cell 20, to the combustor 14. The fuel cell system 100 also includes a combustor's output temperature detector 42 to detect the output temperature of the combustor 14 for producing a combustor output temperature detection output, a reformed gas ingredient concentration presumption unit 32 that presume an ingredient concentration of the reformed gas exhausted from the fuel cell 20 to produce an ingredient concentration presumption output, a combustor temperature controller 44 that calculates an amount of control operation for controlling the output temperature of the combustor 14 toward a target value on the basis of the combustor's output temperature detection output and the ingredient concentration presumption output. The fuel cell system 100 further includes a parameter correction discriminating section C5 for discriminating whether parameters of the reformed gas ingredient concentration presumption unit 32 should be corrected on the basis of the amount of control operation determined by the combustor temperature controller 44, and a parameter correction amount calculating section C6 that calculates an amount of correction required for the parameters when the parameter correction is judged to be needed by the parameter correction discriminating section C5.

In the above embodiment of the present invention, when there exists a deviation between currently detected value of the combustor's output temperature and the target temperature, the integral term exceeds a given upper or lower extreme limit and, consequently, the parameter correction discriminating section C5 discriminates that there exists the deviation in the reformed gas ingredient concentration presumption unit 32. When this occurs, the parameter correction amount calculating section C6 produces a parameter correction output representing an amount of parameter correction to be required in the ingredient concentration presumption unit 32 such that the above-noted deviation is minimized for thereby improving the response time of the fuel cell system in a highly reliable fashion.

Especially, the combustor 14 of the fuel cell system has a characteristic that the process gain varies in dependence on the ingredient concentration of the reformed gas. Accordingly, in order to maximize a response time for control, it is required to vary control gains of the combustor temperature controller 44 in dependence on the variation in ingredient concentration of the reformed gas. To this end, it is a best practice to presume the ingredient concentration of the reformed gas to be supplied to the fuel cell. In the above embodiments of the invention, therefore, the control gains of the combustor temperature controller 44 are calculated in dependence on the output 32a of the reformed gas ingredient concentration presumption unit 32 such that deterioration in response time of the combustor temperature controller 44 is alleviated.

Further, if the value of ingredient concentration presumed in the reformed gas ingredient concentration presumption unit 32 is deviated from the target value by a large value, the value of the integral term that tends to minimize a control deviation of the combustor temperature controller 44 to a zero level goes to a large value. When this happens, the combustor temperature controller 44 does not reliably operate and its control response time is undesirably deteriorated especially when the target temperature varies. In the above embodiments of the present invention, accordingly, the fuel cell system is provided with a parameter correction discriminating section for discriminating that there exits a deviation in the reformed gas ingredient concentration presumption unit 32 when a calculated integral amount in the reformed gas ingredient concentration presumption unit 32 exceeds a given upper or lower extreme limit to thereby produce an output representing the above deviation. This output is inputted to a parameter correction amount calculating section C6 that calculates an amount of parameter correction to be required to produce a parameter correction output whereby the deviation in the combustor temperature controller 44 relative to the target value is decreased to improve the response time in a highly reliable manner.

The entire contents of a Japanese Patent Application No. TOKUGAN 2000-38403 with a filing date of Feb. 16, 2000 in Japan are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A fuel cell system comprising:
   a reformer reforming fuel to produce reformed gas;
   a combustor supplying heat to the reformer;
   an air supply unit supplying air;
   a fuel cell producing electric power by reacting the reformed gas and an oxygen gas contained in the air supplied by the air supply unit;
   an exhaust system returning exhaust reformed gas and exhaust air from the fuel cell to the combustor;
   an exhaust reformed gas ingredient concentration estimation unit calculating ingredient concentration of the exhaust reformed gas by using given parameters and producing an estimated output representing the ingredient concentration of the exhaust reformed gas;

a combustor's output temperature detector detecting an output temperature of the combustor and producing a combustor's output temperature detection output;

a combustor temperature controller controlling the output temperature of the combustor, in response to the estimated output of the ingredient concentration of the exhaust reformed gas and the combustor's output temperature detection output, to attain a predetermined target temperature;

a parameter correction discriminating section discriminating whether correction is required in the given parameters of the exhaust reformed gas ingredient concentration estimation unit and producing a parameter correction discriminating output; and a parameter correction data calculating section producing a parameter correction data in response to the parameter correction discriminating output to correct the given parameters of the exhaust reformed gas ingredient concentration estimation unit.

2. A fuel cell system according to claim 1, wherein the parameter correction discriminating section integrates a deviation between the target value and the temperature detection output to produce an integrated value to discriminate that correction is required in the given parameters of the exhaust reformed gas ingredient concentration estimation unit when the integrated value exceeds an upper or lower extreme value.

3. A fuel cell system according to claim 1, further comprising:

a reformed gas temperature detector detecting temperature of the reformed gas to be supplied to the fuel cell to produce a reformed gas temperature detection output;

a reformed gas flow rate detector detecting flow rate of the reformed gas to be supplied to the fuel cell to produce a reformed gas flow rate detection output;

an electric power output detector detecting electric power output produced by the fuel cell to produce an electric power output detection output; and a reformed gas pressure detector detecting pressure of the reformed gas to be supplied to the fuel cell to produce a reformed gas pressure detection output, wherein the exhaust reformed gas ingredient concentration estimation unit producing a first estimated output representing hydrogen concentration of the exhaust reformed gas on the basis of the reformed gas temperature detection output, the reformed gas flow rate detection output, the electric power output detection output and the reformed gas pressure detection output.

4. A fuel cell system according to claim 1, further comprising:

a reformed gas temperature detector detecting temperature of the reformed gas to be supplied to the fuel cell and producing a reformed gas temperature detection output;

a reformed gas flow rate detector detecting flow rate of the reformed gas to be supplied to the fuel cell and producing a reformed gas flow rate detection output;

an electric power output detector detecting electric power output produced by the fuel cell and producing an electric power output detection output; and a reformed gas pressure detector detecting pressure of the reformed gas to be supplied to the fuel cell and producing a reformed gas pressure detection output, wherein the exhaust reformed gas ingredient concentration estimation unit producing a second estimated output representing CO concentration of the exhaust reformed gas on the basis of the temperature detection output, the reformed gas flow rate detection output, the electric power detection output and the pressure detection output.

5. A fuel cell system according claim 1, wherein the combustor temperature controller calculates a control gain with a predetermined function related to the estimated output of the ingredient concentration of the reformed gas and the combustor's output temperature detection output.

6. A fuel cell system comprising:

a reformer reforming fuel to produce reformed gas;

a combustor supplying heat to the reformer;

an air supply unit supplying air;

a fuel cell producing electric power by reacting the reformed gas and an oxygen gas contained in the air supplied by the air supply unit;

an exhaust system returning exhaust reformed gas and exhaust air from the fuel cell to the combustor;

means for calculating ingredient concentration of the exhasut reformed gas by using given parameters and producing an estimated output representing the ingredient concentration of the exhaust reformed gas;

means for detecting an output temperature of the combustor and producing a combustor's output temperature detection output;

means for controlling the output temperature of the combustor in response to the estimated output and the combustor's output temperature detection output at a predetermined target temperature;

means for discriminating whether correction is required in the given parameters and producing a parameter correction discriminating output; and means for producing a parameter correction data in response to the parameter correction discriminating output to correct the given parameters.

7. A method of controlling a fuel cell system having a reformer reforming fuel to produce reformed gas, an air supply unit, a combustor supplying heat to the reformer, a fuel cell producing electric power by reacting the reformed gas and an oxygen gas contained in air supplied by the air supply unit, and an exhaust system returning exhaust reformed gas and exhaust air to the combustor, the method comprising:

calculating ingredient concentration of the exhasut reformed gas by using given parameters and producing an estimated output representing the ingredient concentration of the exhaust reformed gas;

detecting an output temperature of the combustor and producing a combustor's output temperature detection output;

controlling the output temperature of the combustor in response to the estimated output and the combustor's output temperature detection output at a predetermined target temperature;

discriminating whether correction is required in the given parameters and producing a parameter correction discriminating output; and producing a parameter correction data in response to the parameter correction discriminating output to correct the given parameters.

* * * * *